(12) United States Patent
Kimura

(10) Patent No.: US 6,427,106 B1
(45) Date of Patent: Jul. 30, 2002

(54) CONTROL APPARATUS FOR PASSENGER RESTRAINING SAFETY DEVICES

(75) Inventor: Makoto Kimura, Kanagawa-ken (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/180,676

(22) PCT Filed: Mar. 30, 1998

(86) PCT No.: PCT/JP98/01439

§ 371 (c)(1),
(2), (4) Date: Nov. 13, 1998

(87) PCT Pub. No.: WO98/43853

PCT Pub. Date: Oct. 8, 1998

(30) Foreign Application Priority Data

Mar. 31, 1997 (JP) ............................................. 9-80578

(51) Int. Cl.⁷ ............................................. B60R 21/16
(52) U.S. Cl. ........................... 701/45; 280/735; 180/268
(58) Field of Search ..................... 701/45, 43; 280/735, 280/730, 751, 752; 180/268, 282, 286, 751; 74/2

(56) References Cited

U.S. PATENT DOCUMENTS

| | | | | |
|---|---|---|---|---|
| 4,978,136 A | * | 12/1990 | Tomita et al. | 280/751 |
| 5,326,146 A | * | 7/1994 | Takeuchi | 280/735 |
| 5,538,099 A | * | 7/1996 | Blackburn et al. | 180/282 |
| 5,564,307 A | * | 10/1996 | Uryu | 74/280 |

FOREIGN PATENT DOCUMENTS

| | | |
|---|---|---|
| EP | 0 402 622 | 12/1990 |
| WO | WO 90 09298 | 8/1990 |

\* cited by examiner

*Primary Examiner*—William A. Cuchlinski, Jr.
*Assistant Examiner*—Arthur Donnelly
(74) *Attorney, Agent, or Firm*—McDermott, Will & Emery

(57) ABSTRACT

A restraint system enabling a side air bag to be inflated even if communication between a collision detection device and a restraining device control circuit is broken. The collision detection device repeatedly sends a normal condition signal, having a predetermined high rate period, through a communication line to the restraining device control circuit while a vehicle is traveling normally. If a lateral collision occurs, the collision detection device sends an arithmetic operation start signal through the communication line to the restraining device control circuit, and if a magnitude of impact is equivalent to, or larger than a predetermined magnitude, the collision detection device sends a restraining start signal through the communication line to the restraining device control circuit which then directs a passenger restraining device to operate to protect a passenger. When a collision occurs and the collision detection circuit has already sent the arithmetic operation start signal through the communication line to the restraining device control circuit, if the vehicle is seriously damaged by the collision and the communication line is broken, the restraining device control circuit does not receive a signal, or receives a defective signal after receiving the arithmetic operation start signal. Consequently, the restraining device control circuit operates under condition that a collision has occurred, driving the passenger restraining device to operate.

9 Claims, 3 Drawing Sheets

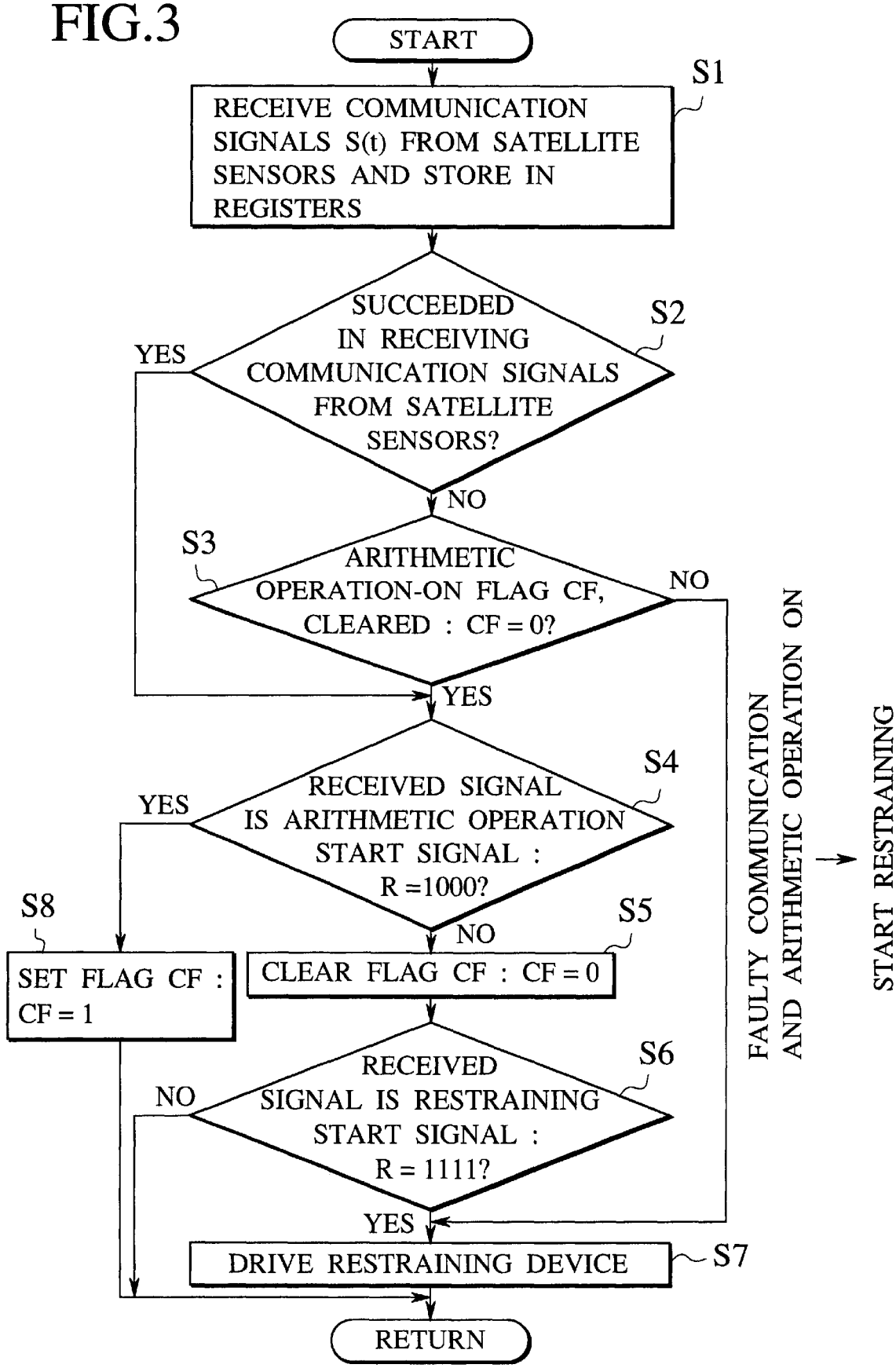

CONTROL APPARATUS FOR PASSENGER RESTRAINING SAFETY DEVICES

FIELD OF THE INVENTION

The present invention relates to a control apparatus for operational control of passenger restraining safety devices such as side air bags.

BACKGROUND OF THE INVENTION

A conventional control apparatus for operating a side air bag of a passenger restraining safety device for a vehicle in order to protect a passenger against a lateral collision of the vehicle comprises satellite collision detecting circuits including collision sensors, e.g., acceleration sensors, mounted on parts, or at positions that will confront and most accurately detect a lateral collision, and a controller mounted on a part, or at a position most likely to be unaffected by a collision of the vehicle, such as a center floor tunnel of an automobile. The satellite collision detecting circuits and the controller are interconnected by communication lines so that a satellite collision detecting circuit which has detected a collision exceeding a predetermined magnitude causes the side air bag at the corresponding side to operate.

For such conventional control apparatus for a passenger restraining safety device, those parts, or positions, on or at which the satellite collision detecting circuits are mounted, are selected so that the impact of a collision will be detected with good accuracy, and the collision sensors will be subjected to the greatest force and damage upon occurrence of a lateral collision. In addition, the layout of the communication lines needed for interconnecting the satellite collision detecting circuits and the controller must be carefully designed so that a collision will not cause disconnection of the communication lines. Validation that there is no disconnection of the communication lines from a collision is established via testing, i.e., repeatedly running vehicle collisions and inspecting the crushed vehicle bodies to determine if there is disconnection of the communication lines.

Therefore, development of such conventional control apparatus for passenger restraining safety devices requires large-scaled experiment facilities as well as a great amount of time and labor for testing in order to provide the required verification that there is no disconnection of the communication lines as a result of the collision. These factors are the principal reasons as to the high cost of such conventional control apparatus for passenger restraining safety devices. Furthermore, because of design rules imposed on the layout of communication lines, there is little flexibility in the layout design, which also increases cost.

SUMMARY OF THE INVENTION

To address such problems of the conventional control apparatus for passenger restraining safety devices, the present invention provides a control apparatus for passenger restraining safety devices which effects secure operation of the passenger restraining safety device to keep a passenger safe even if there is a disconnection of a communication line as a result of a collision.

The control apparatus for passenger restraining safety devices includes a collision detection circuit disposed on a part, or at a position that will confront and accurately detect a lateral collision of a vehicle, a restraining device controller disposed on another part, or at another position of the vehicle, and a passenger restraining device operatively controlled by the restraining device controller. The collision detection circuit and the restraining device controller are interconnected by a communication line, wherein the collision detection circuit outputs a normal condition signal with a predetermined period when no collision is detected, an arithmetic operation start signal with a predetermined period when a collision is first detected, and a restraining start signal with a predetermined period when the detected collision exceeds a predetermined magnitude. The restraining device controller provides an operation command to the passenger restraining device when the restraining start signal is received and also when a defective communication develops after reception of the arithmetic operation start signal.

In the control device for passenger restraining safety devices, while a vehicle is traveling normally, the collision detection circuit repeatedly sends the normal condition signal, having a predetermined high rate period, via the communication line to the restraining device controller. When a lateral collision occurs which exceeds a minimum magnitude, the collision detection circuit sends the arithmetic operation start signal via the communication line to the restraining device controller, and when an integral value corresponding to the magnitude of the collision becomes equal to, or larger than a predetermined magnitude, greater than the minimum magnitude, sends the restraining start signal via the communication line to the restraining device controller, and the restraining device controller directs the passenger restraining device to operate to protect a passenger.

Where a collision has occurred, the arithmetic operation start signal is sent from the collision detection circuit via the communication line to the restraining device controller before significant damage to the vehicle occurs. Subsequently, if the vehicle is so seriously damaged from the collision that a disconnection of the communication line results, since the restraining device controller has received the arithmetic operation start signal and has failed to receive a subsequent signal, or receives a defective signal, the restraining device controller operates under condition that a collision has occurred and directs the passenger restraining device to operate to protect a passenger.

BRIEF DESCRIPTION OF THE DRAWINGS

FIG. 3 is a processing flowchart of an operation of a restraining device controller.

DETAILED DESCRIPTION OF THE DRAWINGS

Figure 1:
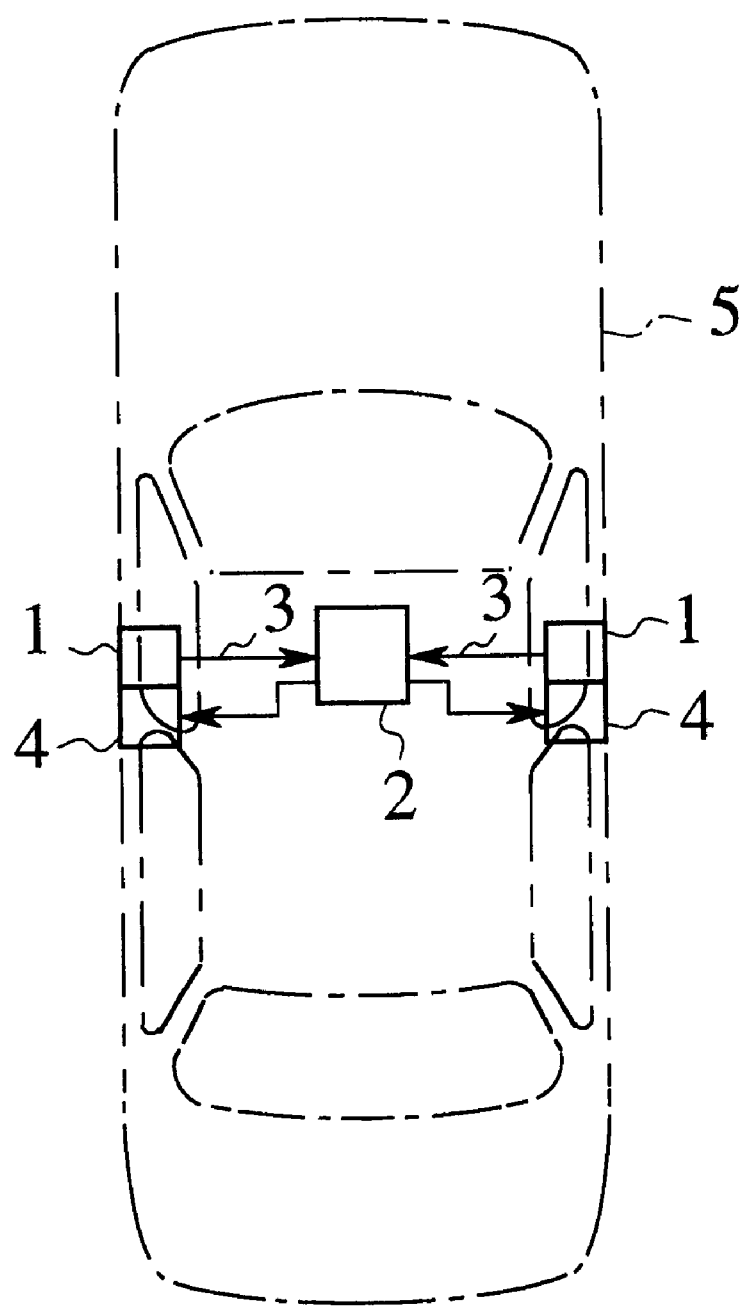
FIG. 1 is a functional block diagram of an embodiment of the invention.

The invention will be described in detail with reference to the accompanying drawings. FIG. 1 illustrates an arrangement of an air bag control apparatus in an automobile 5 including satellite collision detecting circuits 1 for detecting a lateral collision at either the left or right side of the vehicle, a controller 2 comprised of a microcomputer and responsible for determining that an air bag is to be inflated in accordance with a signal from any of the satellite collision detecting circuits 1, a communication line 3 connecting satellite collision detecting circuits 1 with controller 2, and left and right side air bags 4 operatively controlled to be inflated by the controller 2. The controller 2 in FIG. 1 is positioned at a location which will likely be unaffected by a collision such as the center floor tunnel of the automobile 5.

Figure 2:
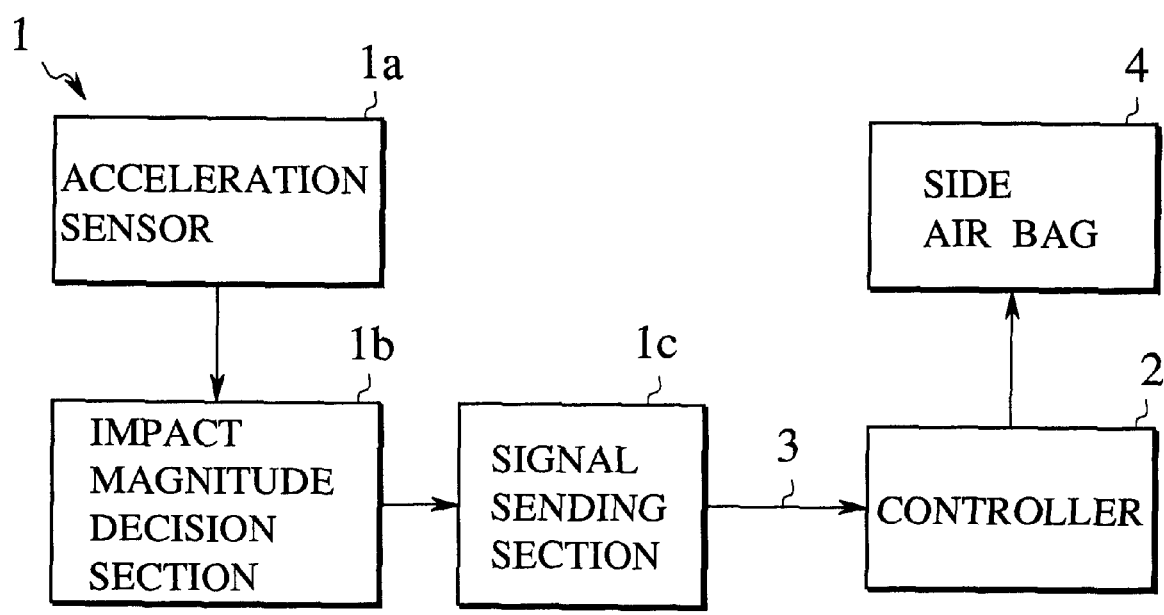
FIG. 2 is a detailed function block diagram of the embodiment of the invention.

As shown in FIG. 2, the left and right satellite collision detecting circuits 1 each comprise an acceleration sensor 1a, an impact magnitude decision section 1b comprised of a microcomputer and responsible for outputting three kinds of signals (to be described later) in accordance with the signal output by the acceleration sensor 1a, and a signal sending section 1c for sending, via the communication line 3, a predetermined type of signal having a predetermined high rate period, to the controller 2 in accordance with the kind of signal output from the impact magnitude decision section 1b.

The acceleration sensor 1a responds to a lateral collision of the automobile and outputs an acceleration signal corresponding to the magnitude of the collision. The impact magnitude decision section 1b receives the acceleration signal from the acceleration sensor 1a and decides i) there is no collision when the signal from the acceleration sensor 1a does not exceed the minimum magnitude for every predetermined period, e.g., 1 ms, ii) to start an arithmetic operation when the acceleration signal from acceleration sensor 1a exceeds the minimum magnitude, or iii) that a collision has occurred and an air bag is to be inflated when an integral value of the signal from acceleration sensor 1a exceeds the predetermined magnitude, greater than the minimum magnitude, within a certain time interval, and provides the signal sending section 1c an output command of a normal signal, an arithmetic operation start signal or a restraining start signal in correspondence with the respective decision. The signal sending section 1c is responsive to the output command from the impact magnitude decision section 1b to send to the controller 2, via the communication line 3, a signal having a code length of a plurality of bits, e.g., 4-bits, corresponding to the output command, e.g., '0101' for the normal condition signal, '1000' for the arithmetic operation start signal, and '1111' for the restraining start signal.

The controller 2 receives the signal from each of the satellite collision detecting circuits 1 and responds to a content thereof to control the side air bag 4 to be inflated as a restraining device when needed. Controller 2 checks the receiving state of the signal sent from each of the satellite collision detecting circuits 1 and the content of the received signal, and does not start inflating the air bag when the normal condition signal '0101' is received, but drives the side airbag 4 to be inflated at a corresponding side when the restraining start signal '1111' is received after receipt of the arithmetic operation start signal '1000'. Also, if a communication failure or a defective communication occurs following reception of the arithmetic operation start signal '1000', controller 2 controls the side air bag 4 to be driven to inflation at a corresponding side.

Described below are actions of the controller for controlling operation of passenger restraining safety devices with references to a flowchart of FIG. 3 in which a processing is periodically cycled at a high rate of processing intervals, e.g., 1 ms.

(For no Collision)

The controller 2 receives communication signals S (t) from the left and right satellite collision detecting circuits 1 and stores the signals in registers (step S1) before deciding whether or not the communication signals from the satellite collision detecting circuits have been successfully received (step S2). If the communication signal is successfully received, the flow goes to a step S4 (step S2). When the received signal is the normal condition signal '1010' (there is no collision), at step S4 the decision is that the received signal is not the arithmetic operation start signal '1000' and the flow branches to a NO where, in turn, an arithmetic operation-on flag CF is cleared to "0", i.e., CF=0 (step S5). Also, at a subsequent step S6, the decision is that the received signal is not the restraining start signal '1111' (the normal condition signal '1010' having been received) and the flow branches to a NO to return. Accordingly, when there is no collision, the side air bags 4, as restraining devices, are not driven to inflation.

(Upon Collision, with no Disconnection in Communication Lines)

If a collision, greater than the minimum magnitude, occurs at either the left or right side of the vehicle, the respective acceleration sensor 1a detects such condition and the arithmetic operation start signal '1000' is transmitted to the controller 2 via impact magnitude decision section 1b,. signal sending section 1c and the communication line 3. The arithmetic operation start signal '1000' is received and stored in a register (step S1) before deciding whether or not the communication signal from the satellite collision detecting circuit has been successfully received (step S2). As the communication signal in a current processing cycle has been successfully received, the decision at step S2 is YES and the flow branches to step S4.

At step S4, with a decision that the received signal is the arithmetic operation start signal '1000', the flow branches to a YES, and the arithmetic operation-on flag CF is set to "1", i.e., CF=1 (step S8), before a return.

In a subsequent processing cycle, the integral value of the signal from the acceleration sensor 1a, corresponding to the magnitude of the collision, will have increased to be in excess of the predetermined magnitude, greater than the minimum magnitude, so that there is a decision that the collision is significant, necessitating an air bag inflation. Consequently, the restraining start signal '1111' is sent from impact magnitude decision section 1b. As the communication line 3 is not broken, the restraining start signal '1111' is received and stored in a register (step S1), and the flow proceeds to step S2 where, as the reception of the restraining start signal '1111' has been successful, the flow branches to a YES to go to step S4. As the received signal is the restraining start signal '1111', at step S4, the flow branches to a NO where the arithmetic operation-on flag CF is cleared to "0"; i.e., CF=0 (step S5), and at step S6, the flow branches to a YES for driving the side air bag 4 to be inflated as a restraining device (step S7).

(Upon Collision, with Disconnection of Communication Line)

In the case that a collision occurs at either the left or right side of the vehicle and the magnitude of the collision is so large as to cause serious damage and to break communication line 3, the side air bag 4 at the corresponding side is driven to be inflated in the below described manner.

Until just before the occurrence of the collision exceeding the minimum magnitude, the controller 2 has been cycling processes for no collision where the arithmetic operation-on flag CF is set to "0", i.e., CF=0. At an instance just after the collision where the vehicle is in an initial phase of becoming damaged, the arithmetic operation start signal '1000' is transmitted from the corresponding satellite collision detecting circuit 1 through the communication line 3 and the flow branches to the YES at step S4 where the arithmetic operation-on flag CF is set to "1", i.e., CF=1.

Then, the vehicle becomes seriously damaged by the collision and the magnitude of the collision is so large as to cause a disconnection in communication line 3, resulting in a failure to receive a signal from the corresponding satellite collision detecting circuit 1. Consequently, the flow in the subsequent processing cycle branches to NO at step S2 because of the failure to successfully receive the signal from the satellite collision detecting circuit 1. As the arithmetic operation-on flag CF has been set to "1" in the previous cycle, i.e., CF=1, the flow branches to NO under the decision at step S3 in the subsequent processing cycle and directly goes to step S7 where the side air bag 4 is driven to be inflated as a restraining device.

As described, in the control apparatus for passenger restraining devices according to the embodiment, the controller 2 supervises signals sent from satellite collision detecting circuits 1 and drives a corresponding side air bag 4 to be inflated not only with reception, in order, of a normal signal→an arithmetic operation start signal→a restraining start signal, but also if reception of the arithmetic operation start signal is followed by a failure to receive a signal, or receipt of a defective signal (faulty communication) without reception of normal signal. This effects a secured operation of a restraining device to restrain a passenger for protection even when a serious lateral collision occurs and the communication line 3 is disconnected.

The invention is not limited to the embodiment described and each satellite collision detecting circuit provided on a part, or at a position to confront and detect a lateral collision of a vehicle, may be implemented as an impact detection method using an arbitrary one of a variety of conventionally employed algorithms. Moreover, the sensors for detecting a magnitude of a collision are not limited to acceleration sensors, as disclosed in the present embodiment, but may be any other sensors, which provide a signal corresponding to the magnitude of a collision.

Further, a side air bag has been illustratively described as the object to be driven for a restraining by the controller 2. However, a pre-tensional seat belt, or knee protector which operates to tightly fasten in response to the restraining start signal may be substituted for, or concurrently employed with the side air bag as the restraining device.

The many features and advantages of the invention are apparent from the detailed specification, and thus, it is intended by the appended claims to cover all such features and advantages of the invention which fall within the true spirit and scope of the invention. Since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. An occupant restraint system, comprising:
a collision detector positioned at a lateral portion of a vehicle and configured
to detect an absence, a presence, and a magnitude of impact of a lateral collision of the vehicle, and
to provide a detection signal as one of
a first signal to be periodically output when the absence of the lateral collision is detected,
a second signal to be periodically output when the presence of the lateral collision is detected, and
a third signal to be output when the magnitude of impact of the lateral collision is greater than a predetermined magnitude of impact;
a communication line configured to transmit the detection signal;
a restraint controller positioned at another portion of the vehicle and connected with the collision detector by the communication line, the restraint controller being responsible for a signal received from the communication line to provide an operation command as the received signal is one of
the second signal followed by a malfunction of the communication line, and
the third signal; and
an occupant restraint operative with the operation command to restrain an occupant in the vehicle.

2. An occupant restraint system according to claim 1, wherein the malfunction of the communication line is detected as a failure for the restraint controller to receive the detection signal from the communication line.

3. An occupant restraint system according to claim 2, wherein the collision detector comprises:
a sensing part configured to detect a magnitude of the lateral collision in terms of acceleration;
a decision part configured
for a first decision to provide one of the first signal to be output when the magnitude of the lateral collision is not greater than a predetermined magnitude and the: second signal to be output when the magnitude of the lateral collision is greater than a predetermined magnitude,
for a periodical integration of the magnitude of the lateral collision to determine the magnitude of impact of the lateral collision, and
for a second decision, superseding the first decision, to provide the third signal when the magnitude of impact of the lateral collision is greater than the predetermined magnitude of impact; and
a signal sending part configured to send said one of the first and second signals and third signal to the communication line.

4. A method of controlling an occupant restraint operative with an operation command to restrain an occupant in a vehicle, comprising:
performing a collision detection at a lateral portion of the vehicle
to detect an absence, a presence, and a magnitude of impact of a lateral of vehicle, and
to provide a detection signal as one of
a first signal to be periodically output when the absence of the collision is detected,
a second signal to be periodically output when the presence of the lateral collision is detected, and
a third signal to be output when the magnitude of impact of the lateral collision is greater than a predetermined magnitude of impact;
transmitting the detection signal by a communication line; and
performing a restraint control at another portion of the vehicle in response to a signal received from, the communication line to provide the operation command, as the received signal is one of
the second signal followed by a malfunction of the communication line, and
the third signal.

5. An occupant restraint control system, comprising:
a collision detector positioned at a lateral portion of a vehicle and configured
for detection of a magnitude of an acceleration acting on the lateral portion of the vehicle,
for a first decision based on the magnitude of the acceleration to determine if an impact experienced at the lateral portion of the vehicle is critical,
for a second decision based on the magnitude of the acceleration to determine a periodical condition of the acceleration, and
for generation of
a critical condition signal to be output when the impact is determined to be critical in the first decision, and a periodical condition signal informing the periodical condition of the acceleration;

occupant restraint controller positioned at another portion of the vehicle and configured for a reception of the critical condition signal to make a third decision to provide an occupant restraint activation signal, and for combination of a reception and a failure of reception of the periodical condition signal to make forth decision to be equivalent to the third decision when the periodical condition informed before the failure of reception is critical; and a communication device provided for communication between the collision the collision detector and the occupant restraint controller and configured to transmit the critical condition signal and the periodical condition signal.

6. An occupant restraint control system according to claim 4, wherein the communication device comprises a communication line extending between the collision detector and the occupant restraint controller, and a signal sender configured to sent the critical condition signal and the periodical condition signal to the communication line.

7. An occupant restraint control System according to claim 4, wherein the generation of the critical condition signal supersedes that of the periodical condition Signal.

8. An occupant restraint control system, comprising:

collision detector means positioned at a lateral portion of a vehicle for detecting a magnitude of an acceleration acting on the lateral portion of the vehicle, making a first decision based on the magnitude of the acceleration to determine if an impact experienced at the lateral portion of the vehicle is critical, making a second decision based an the magnitude of the acceleration to determine a periodical condition of the acceleration, and generating a critical condition signal to be output when the impact is determined to be critical in the first decision, and a periodical condition signal informing the periodical condition of the acceleration;

occupant restraint control means positioned at another portion of the vehicle for receiving the critical condition signal to make a third decision to provide an occupant restraint activation signal, and responding to combination of a reception and a failure of reception of the periodical condition signal by making u fourth decision to be equivalent to the third decision when the periodical condition informed before the failure of reception is critical; and communication means provided for communication between the collision detector and the occupant restraint controller to transmit the critical condition signal and the periodical condition signal.

9. An occupant restraint control method, comprising:

detecting a magnitude of an acceleration acting on a lateral portion of the vehicle;

making a first decision based on the magnitude of the acceleration to determine if an impact experienced at the lateral portion of the vehicle is critical;

making a second decision based on the magnitude of the acceleration to determine a periodical condition of the, acceleration;

generating a periodical condition signal informing the periodical condition of the acceleration;

transmitting the periodical condition signal by a communication line extending between the lateral portion and another portion of the vehicle;

generating a critical condition signal when the impact is determined to be critical in the first decision;

transmitting the critical condition signal by the communication line;

responding to a reception of the critical condition signal from the communication line by making a third decision to provide an occupant restraint activation signal; and responding to combination of a reception and a failure of reception of the periodical condition signal from the communication line to make a fourth decision to be equivalent to the third decision when the periodical condition informed before the failure of reception is critical.

* * * * *